Aug. 7, 1951  H. W. CARDWELL ET AL  2,563,673
FLUID PRESSURE OPERATED FLEXIBLE DISK CLUTCH
Filed May 10, 1950  4 Sheets-Sheet 1

INVENTORS
Harland W. Cardwell &
Gerald G. Brown
BY Bacon + Thomas
ATTORNEYS

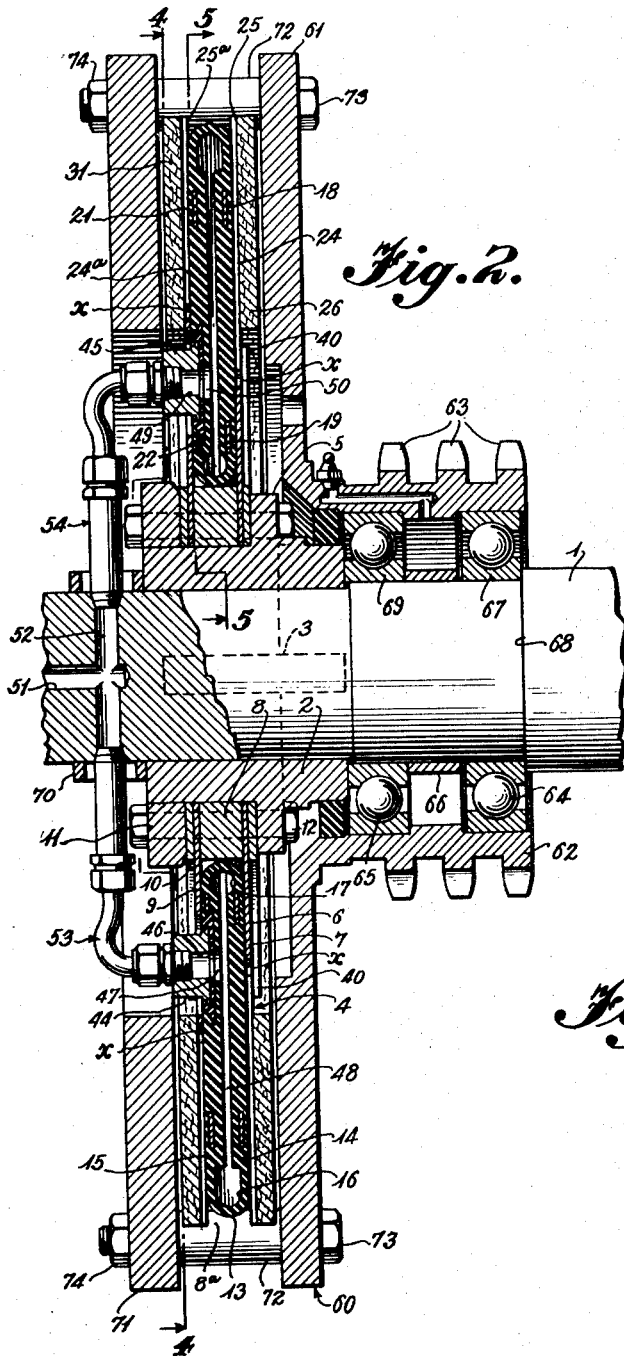
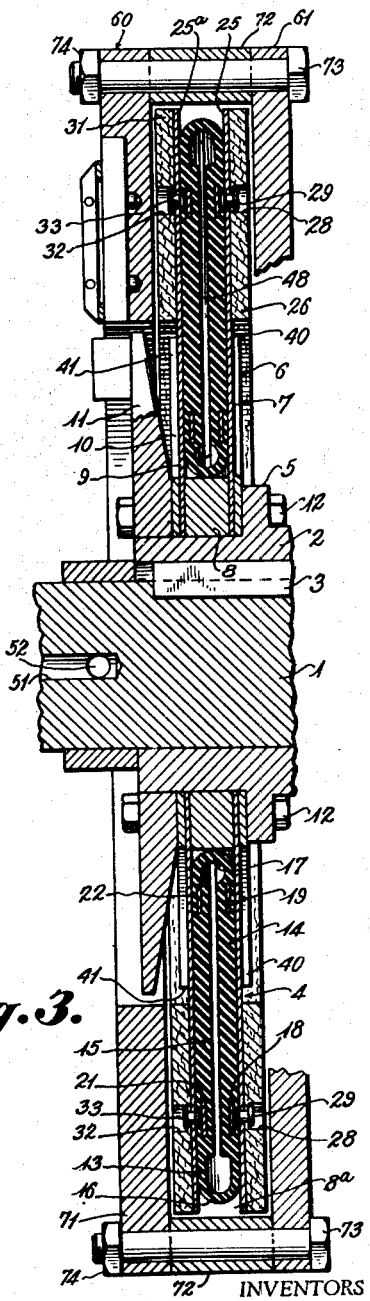

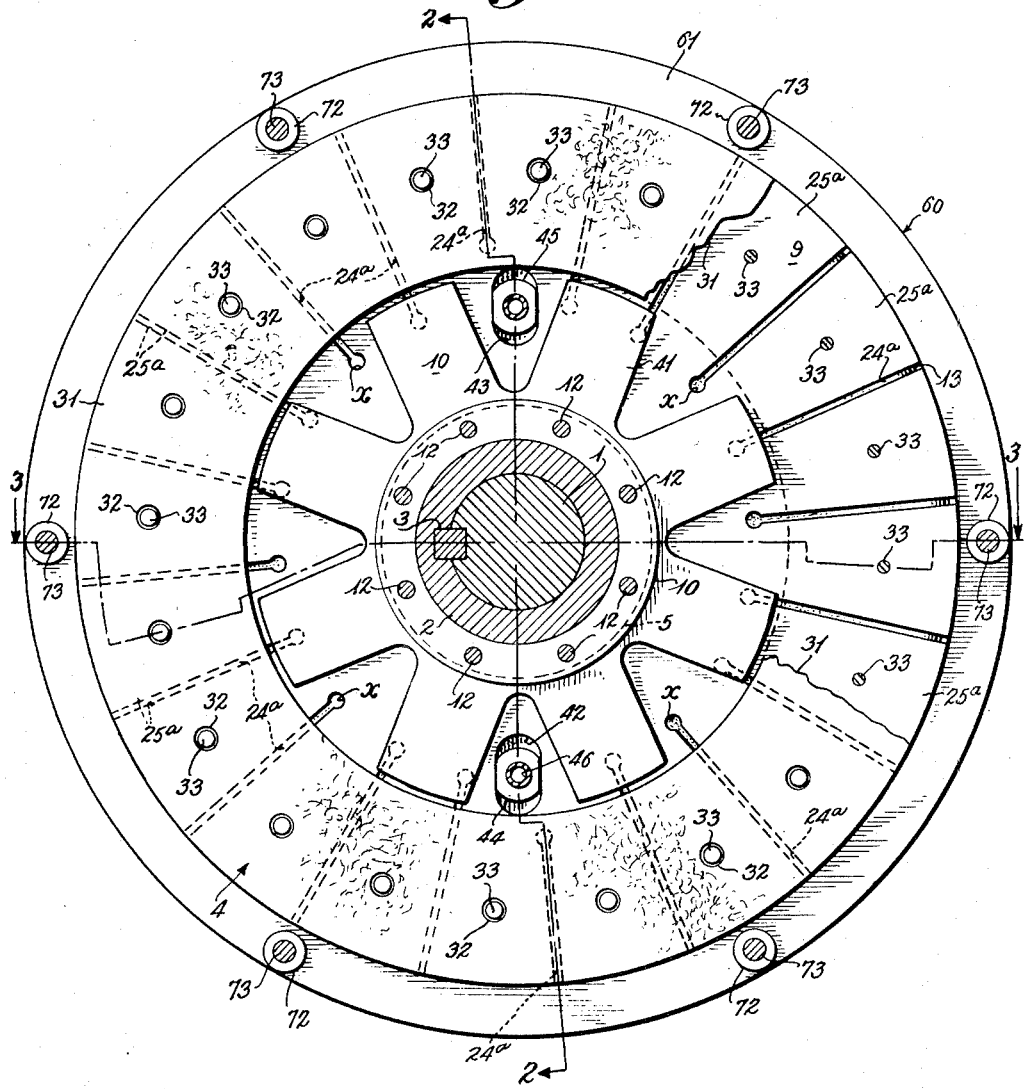

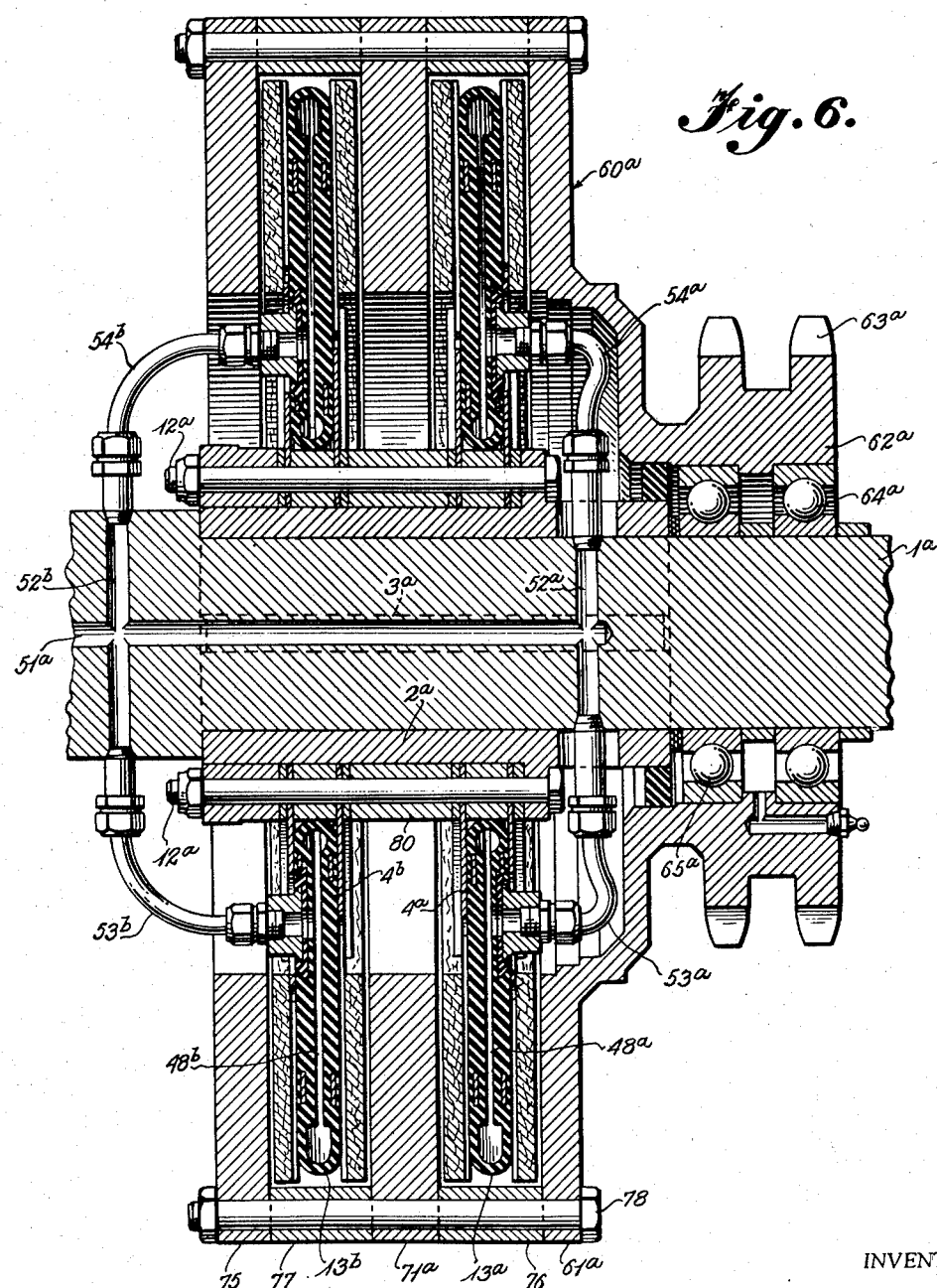

Patented Aug. 7, 1951

2,563,673

UNITED STATES PATENT OFFICE 2,563,673

FLUID PRESSURE OPERATED FLEXIBLE DISK CLUTCH

Harland W. Cardwell and Gerald G. Brown, Wichita, Kans., assignors to Cardwell Manufacturing Company, Inc., Wichita, Kans.

Application May 10, 1950, Serial No. 161,190

13 Claims. (Cl. 192—88)

The present invention relates to fluid pressure operated clutches and more particularly to an air-operated clutch of the type having an inflatable member disposed between a pair of flexible discs each carrying a friction facing member.

Experience has shown that in some clutches of the above character, the resilient discs have a tendency to assume an undesirable permanent dish-shape after having been in service for some time. Such deformation of the discs from their original normally flat condition produces the undesirable effect of delaying the disengagement of the friction facings and hence, delaying the interruption of the drive between the driving and driven parts of the clutch. The objection is eliminated in the present invention by providing each of the flexible discs with a series of radial slots extending a substantial distance inwardly from the outer periphery of the respective discs to provide a plurality of long flexible fingers; the friction facing members being carried by such fingers.

Experience with clutches of the above character has also shown that centrifugal force at high speeds has the effect of undesirably distending the annular inflatable rubber member usually employed as an expansible pressure chamber between the flexible discs. This objection is overcome in the present invention by embedding metallic reinforcing rings in the respective side walls of the inflatable member, preferably at both the inner and outer marginal portions of said side walls.

A further improvement embodied in the present invention resides in the provision of one or more resilient backing plates at the outer side of each of the flexible discs, such backing plates having fingers which engage with the fingers of the flexible discs and serve as a yieldable support therefor during the time that the discs are flexed apart, i. e., during engagement of the clutch, and which also serve to assist the fingers of the flexible discs to return to their original flat condition and to hasten the expulsion of air from the expansible pressure chamber to thereby effect rapid disengagement of the clutch upon release of the clutch-engaging pressure.

The principal object of the invention is to provide an improved fluid pressure operated clutch in which all tendency for the flexible discs carrying the friction facing members to assume a permanently dished condition is eliminated.

Another object of the invention is to provide a fluid pressure operated clutch including means for effecting rapid disengagement of the clutch and for returning the flexible discs to their normally flat condition upon the exhaust of fluid pressure from the expansible pressure chamber.

A further object of the invention is to provide a fluid pressure operated clutch in which the inflatable member is provided with means for overcoming the action of centrifugal force which tends to radially distend the inflatable member.

Other objects and advantages of the invention will be apparent from the following description taken in conjunction with the accompanying drawings, in which:

Fig. 2 is a sectional view through the clutch taken on the lines 2—2 of Figs. 1 and 4, respectively, and particularly illustrating the means by which fluid under pressure is introduced into and exhausted from the inflatable member to effect engagement and disengagement, respectively, of the clutch;

Fig. 3 is a sectional view taken on the lines 3—3 of Figs. 1 and 4, respectively, and substantially at right angles to the sectional plane represented by Fig. 2;

Fig. 4 is a sectional view taken on the line 4—4 of Fig. 2, but showing a portion of one of the friction facing members broken away;

Fig. 6 is a sectional view similar to Fig. 2 but illustrating a typical multiple disc clutch.

Figure 1:
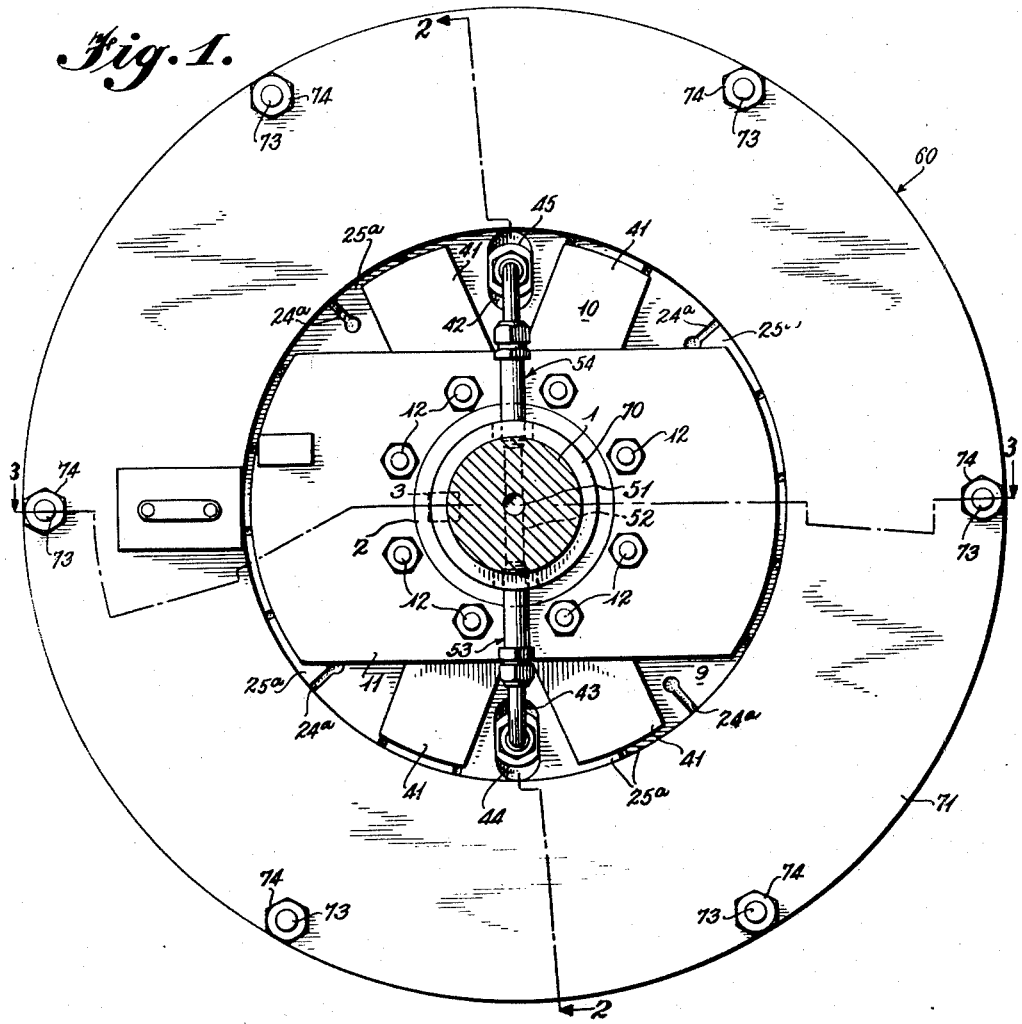
Fig. 1 is an elevational view of a clutch construction embodying the principles of the present invention.
Figure 5:
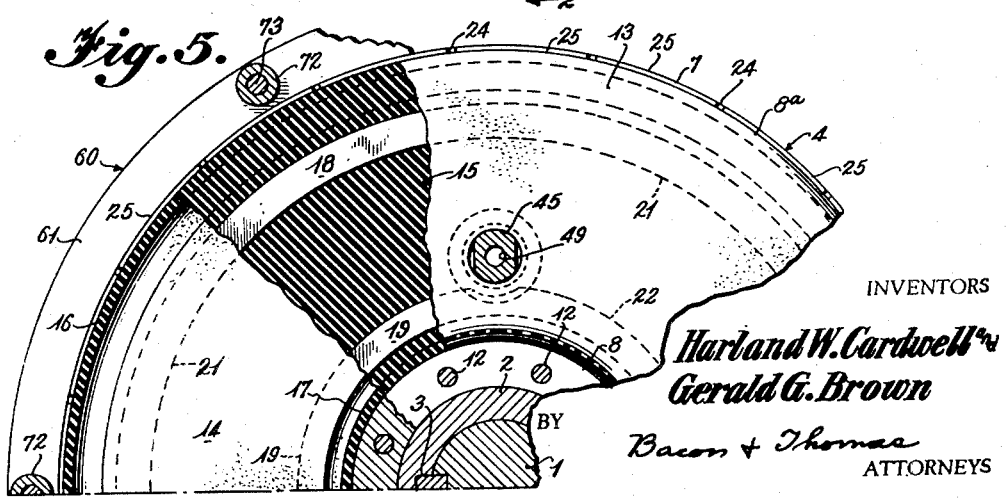
Fig. 5 is a fragmentary sectional view taken on the line 5—5 of Fig. 2 with portions of the inflatable member shown broken away and in cross-section in the interest of better illustration of the parts.

Referring now more particularly to Fig. 1, a drive shaft is identified by the numeral 1 and a metal hub portion 2 is non-rotatably mounted thereon by means of a conventional key 3. The hub 2 forms an element of the driving part or driving assembly of the clutch, which is generally identified by the numeral 4. The hub portion 2 has a radially extending flange 5 formed on its outer periphery at a region approximately medially of the axial length thereof. The flange 5 forms a shoulder on one side of which is disposed, in the order named, a spring metal backing plate 6, a resilient metal disc 7, a metal spacer ring 8, a resilient metal disc 9, a spring metal backing plate 10 and a metallic clamping plate 11. The flange 5, the spring backing plates 6 and 10, the flexible discs 7 and 9, the spacer ring 8 and the clamping plate 11 are all provided with aligned openings for the reception of a plurality of bolts 12 for maintaining the driving part 4 in assembled relation. As illustrated, one backing plate is disposed on the outer side of each resilient disc, but it will be understood that more than one backing plate may be used, depending upon operating condition requirements.

The discs 7 and 9 are separated to provide an annular space 8a therebetween disposed outwardly of the spacer ring 8, and an annular inflatable member 13 is disposed in said space. The inflatable member 13 is made of fabric-reinforced rubber and includes opposed side walls 14 and 15 which are relatively thicker than the inner and outer flexible marginal portions 16 and 17, respectively, of said inflatable member. The portion 16 is disposed slightly inwardly of the outer periphery of the discs 7 and 9 and the portion 17 lies adjacent the inner margin of said discs and in contact with the spacer ring 8. One metallic reinforcing ring 18 is embedded in the side wall 14 adjacent the outer flexible marginal portion 16 and a second metallic reinforcing ring 19 is embedded in said wall adjacent the inner marginal portion 17. Similar rings 21 and 22 are embedded in the other side wall 15.

The discs 7 and 9 are respectively provided with a plurality of radial slots 24 and 24a, which extend inwardly from the outer periphery thereof to any desired or practical depth, compatible with the principles of the present invention. Twenty slots 24 and 24a are formed in the discs 7 and 9, and these slots provide the outer marginal portion of said discs with a corresponding number of flexible fingers 25 and 25a. Each of the fingers 25 and 25a is provided with a centrally located hole to receive a fastening member, for purposes explained hereinafter.

An annular friction facing member 26 is disposed on the outer side of the disc 7 and is provided with twenty countersunk holes 28 which register with the holes in the fingers 25. Rivets 29 (Fig. 3) extend through all of the countersunk holes 28 and through all of the holes in the fingers 25 for securing the friction member 26 to said fingers. Thus, the friction facing member 26 is secured directly to the flexible fingers 25 of the disc 7 for torque transmitting purposes. Similarly, an annular friction facing member 31 is provided with twenty countersunk holes 32 and rivets 33 extend through all of said holes and through the holes in the fingers 25a of the flexible disc 9 for directly securing the friction facing 31 to said disc. The friction facing members 26 and 31 have an outer diameter substantially equal to the outer diameter of the inflatable member 13, and the outer sides thereof are adapted to engage with the inner faces of a pair of plates comprising a driven clutch part, as will be described more fully hereinafter.

The backing plate 10, Fig. 4, has eight spring fingers 41 which extend radially beyond the inner ends of the slots 24a and serve as resilient supports or reinforcing members for the fingers 25a of the disc 9. The backing plate 6 is provided with a similar number of spring fingers 40 cooperable in a like manner with the slots 24 and fingers 25 of the flexible disc 7. It will be understood from Fig. 4 that the slots 24 and 24a extend inwardly a substantial distance beyond the ends of the fingers 40 and 41 and terminate at their inner ends in drilled holes x for preventing the formation of fractures in the discs 7 and 9.

The disc 9 is identical to the disc 7 except that, it is provided with two elongated openings 42 and 43 arranged upon a common diametrical line and positioned so that spuds 44 and 45 embedded in the wall 15 of the inflatable member 13 extend therethrough, and that the slots 24a immediately beyond said elongated openings are of necessity made shorter than the remaining slots. The spud 44 has a passageway 46 aligned with an opening 47 formed in the wall 15 for establishing communication between the passageway 46 and a chamber 48 within the inflatable member 13. The spud 45 has a passageway 49 aligned with a similar opening 50 also formed in the wall 15 and communicating with the chamber 48.

The shaft 1 has an axially extending opening 51 adapted to communicate with a source of supply of air under pressure (not shown). A transverse passageway 52 in the shaft 1 communicates with the inner end of the axial opening 51. One end of the passageway 52 is connected to the spud 44 by suitable tubing and fittings generally identified by the numeral 53. The other end of the passageway 52 is connected with the spud 45 by similar tubing and fittings generally identified by the numeral 54.

A driven clutch part or assembly is generally identified by the numeral 60 and includes a plate 61 having an axially extending hub portion 62 provided with sprocket teeth 63 or any other suitable drive transmitting means. The hub portion 62 is rotatably mounted upon the shaft 1 by a pair of conventional ball bearings 64 and 65 having a spacer 66 disposed therebetween. The inner race 67 of the ball bearing 64 engages a shoulder 68 on the shaft 1 and the inner race 69 of the ball bearing 65 is engaged by one end of the hub 2. A collar 70 is disposed adjacent the opposite end of the hub 2 and suitably non-rotatably secured to the shaft to prevent inadvertent axial movement of the ball bearings 64 and 65 and the hub 2 relative to the shaft 1.

The driven clutch part 60 also includes an annular plate 71 which is maintained in axially spaced confronting relation to the plate 61 by a plurality of tubular spacers 72 disposed between said plates. A bolt 73 extends through each of the spacers 72 and through aligned openings in the plates 61 and 71 and a nut 74 threaded on said bolts maintains the plates 61 and 71 and the spacers 72 in assembled relation.

The inner face of the plate 61 is adapted to be engaged by the friction facing 26 and the inner face of the plate 71 is adapted to be engaged by the friction facing 31. Valve means (not shown) controls the supply and exhaust of air, or other operating fluid, under pressure to the chamber 48 through the spuds 44 and 45. The provision of the two spuds 44 and 45 facilitates the introduction of air under pressure into the chamber 48 and thus insures rapid inflation of the expansible member 13 for effecting flexing apart of the outer marginal portions of the discs 7 and 9 to insure quick engagement of the friction facings 26 and 31 with the adjacent faces of the plates 61 and 71 of the driven part 60. Movement of the friction facings 26 and 31 into engagement with the plates 61 and 71, respectively, is effected through flexing of the fingers 25 and 25a of the discs 7 and 9 apart, to thereby provide a driving engagement between the driving part 4 and the driven part 60. The fingers 25 and 25a are yieldably supported during outward flexing by the fingers 40 and 41, respectively, carried by the backing plates 6 and 10.

The discs 7 and 9 are normally flat and tend to return to their original flat condition to retract the friction facings 26 and 31 from driving engagement upon the release of pressure fluid from the chamber 48. However, the spring backing plates 6 and 10, with their flexible fingers 40 and 41, respectively, augment the resilience of the fingers 25 and 25ª to effect quick retraction of the friction facings 26 and 31 from driving engagement with their associated plates 61 and 71, and facilitate the expulsion of air from the chamber 48 of the inflatable member 13 to assure quick disengagement of the clutch.

The reinforcing rings 18, 19, 22 and 23 embedded in the side walls 14 and 15, respectively, of the inflatable member 13 provide the further advantage of preventing the inflatable member from being radially distended or distorted in operation by the action of centrifugal force when the clutch is rotating at high speed. The centrifugal action on the inflatable member 13 has an undesirable and detrimental effect thereon which is obviated by the present construction.

Fig. 6 illustrates a modified clutch construction including two inflatable members 13ª and 13ᵇ, which are identical in construction to the inflatable member 13 described in detail hereinbefore. The inflatable member 13ª is disposed between plates 61ª and 71ª, similar to the plates 61 and 71, and the inflatable member 13ᵇ is disposed between the plate 71ª and an additional plate 75. The plates 61ª and 71ª are separated by tubular spacers 76 similar to the spacers 72, and additional spacers 77 maintain the plate 75 spaced from the plate 71ª. Bolts 78, longer than the bolt 73, but similar thereto, maintain the plate 61ª, spacer 76, plate 71ª, spacer 77, and plate 75 in assembled relation to provide a driven part or assembly 60ª. A driving clutch part 4ª similar to the driving part 4 is interposed between the plates 61ª and 71ª and a similar driving part 4ᵇ is interposed between the plates 71ª and 75; the driving parts 4ª and 4ᵇ being separated by a spacer ring 80. The driving parts 4ª and 4ᵇ, and the spacer ring 80 are secured to a hub 2ª similar to but longer than the hub 2, by means of a plurality of bolts 12ª. The hub 2ª is secured to a drive shaft 1ª by a conventional key 3ª. The shaft 1ª has an axially extending passageway 51ª connected with a source of air, or other operating fluid, under pressure (not shown) and two transverse passageways 52ª and 52ᵇ intersecting said axial passageway. Tubing 53ª and 54ª connect the passageway 52ª with the chamber 48ª within the expansible element 13ª, and tubing 53ᵇ and 54ᵇ connect the passageway 52ᵇ with the chamber 48ᵇ in the expansible member 53ᵇ.

The plate 61ª includes a hub portion 62ª having sprocket teeth 63ª for driving a sprocket chain (not shown). The hub portion 62ª contains ball bearings 64ª and 65ª for supporting the driven assembly of the plates 61ª, 71ª, and 75 for free rotation relative to the shaft 1ª, when the clutch is disengaged.

It will be obvious that upon introduction of air under pressure into the passageway 51ª, the air will be conducted through the tubes 53ª—54ª and 53ᵇ—54ᵇ to the chambers 48ª and 48ᵇ of the expansible elements 13ª and 13ᵇ, respectively, to engage the friction facings associated with the driving parts 4ª and 4ᵇ with the adjacent faces of the plates 61ª, 71ª and 75 to establish a driving connection between the shaft 1ª and the sprocket 63ª.

It will be understood that the present invention is not limited as to the number of plates employed in a clutch, and for illustrative purposes, Fig. 6 has been included to illustrate the manner in which two expansible elements may be employed to establish a driving connection between the driving and driven elements of a clutch. It will be evident from this figure that a clutch embodying any desired number of plates and expansible elements can be readily constructed.

It will also be understood that the assemblies 60 and 60ª may be employed as driving, instead of driven parts and that the assemblies 4 and 4ª—4ᵇ may be correspondingly employed as driven instead of driving parts, within the purview of the invention.

It will be further understood that changes may be made in the details of construction and in the arrangement of the parts described in connection with the two forms of clutches disclosed herein, without departing from the scope of the annexed claims.

We claim:

1. A friction plate assembly, comprising: a pair of discs, each of said discs carrying a plurality of radial flexible fingers; a friction facing member disposed on the outer side of each of said discs and separately secured to each of the fingers of its associated disc; an inflatable member disposed between said discs in confronting relation to the fingers thereof; and means for introducing operating fluid under pressure into said inflatable member to cause the fingers on the respective discs to move apart.

2. A friction plate assembly, comprising: a pair of discs, each of said discs carrying a plurality of radial flexible fingers projecting outwardly; a friction facing member disposed on the outer side of each of said discs and separately secured to each of the fingers of its associated disc; an inflatable member disposed between said discs in confronting relation to the fingers thereof; means for introducing operating fluid under pressure into said inflatable member to cause the fingers on the respective discs to move apart; and means engaging said fingers adjacent their inner ends and yieldably opposing such movement of said fingers.

3. A friction plate assembly, comprising: a pair of discs, each of said discs carrying a plurality of radial flexible fingers; a friction facing member disposed on the outer side of each of said discs and separately secured to each of the fingers of its associated disc; an inflatable member disposed between said discs in confronting relation to the fingers thereof; means for introducing operating fluid under pressure into said inflatable member to cause the fingers on the respective discs to move apart; and a resilient backing plate on the outer side of each of said discs engaging said fingers at their inner ends and yieldably opposing such outward movement of said fingers.

4. A friction plate assembly, comprising: a pair of discs, each of said discs having a series of radial slots extending inwardly from its outer periphery to provide a plurality of flexible fingers; a friction member disposed on the outer side of each of said discs and separately secured to each of the fingers of its associated disc; an inflatable tube disposed between said discs in confronting relation to the fingers thereof; and means for introducing operating fluid under pressure into said inflatable member to cause the fingers of the respective discs to move apart.

5. A friction plate assembly, comprising: a pair of discs, each of said discs having a series of radial slots extending inwardly from its outer periphery to provide a plurality of flexible fingers; a friction member disposed on the outer side of each of said discs and separately secured to each of the fingers of its associated disc; an inflatable tube disposed between said discs in confronting relation to the fingers thereof; means for introducing operating fluid under pressure into said inflatable member to cause the fingers of the respective discs to move apart; and means engaging said fingers and yieldably opposing such movement of said fingers.

6. A friction plate assembly, comprising: a pair of discs, each of said discs having a series of radial slots extending inwardly from its outer periphery to provide a plurality of flexible fingers; a friction member disposed on the outer side of each of said discs and secured to the fingers of its associated disc; an inflatable tube disposed between said discs in confronting relation to the fingers thereof; means for introducing operating fluid under pressure into said inflatable member to cause the fingers of the respective discs to move apart; and a resilient backing plate on the outer side of each of said discs engaging said fingers and yieldably opposing such outward movement of said fingers.

7. A friction plate assembly, comprising a pair of discs, each of said discs having a series of radial slots extending inwardly from its outer periphery to provide a plurality of flexible fingers; a friction member disposed on the outer side of each of said discs and secured to the fingers of its associated disc; an inflatable tube disposed between said discs in confronting relation to the fingers thereof; means for introducing operating fluid under pressure into said inflatable member to cause the fingers of the respective discs to move apart; and a backing plate on the outer side of each of said discs, each of said backing plates having a plurality of flexible fingers extending radially outwardly beyond the inner ends of said slots and engaging said fingers of said discs for yieldably opposing such movement of said fingers of said discs.

8. A friction plate assembly, comprising: a mounting member adapted to be secured to a shaft; a pair of annular metal discs secured to said mounting member, each of said discs having a plurality of fingers; a friction facing member secured to said fingers on the outer sides of said discs; an inflatable member disposed between said discs in the region of said friction facings and providing an expansible pressure chamber between said discs; means communicating with said pressure chamber for introducing operating fluid under pressure into said chamber to flex the sides of said inflatable member outwardly and the fingers of said discs apart; and a backing plate on said mounting member on the outer side of each of said discs, each of said backing plates having a plurality of flexible fingers engaging the fingers of said discs for yieldably opposing such flexing of said fingers of said discs.

9. A friction plate assembly, comprising: a pair of rotatable thin resilient discs; spacer means at the inner margin of said discs maintaining said discs separated to provide a space therebetween, each of said discs being slotted to provide a plurality of radially disposed highly flexible fingers; a friction member disposed on the outer side of each of said discs; means securing said friction members to said discs; an annular inflatable tube disposed in said space between said discs, said tube having opposed side walls; a metallic reinforcing ring embedded in each of said side walls adjacent the outer margin thereof for opposing radial distention of said tube under the action of centrifugal force; and means for introducing operating fluid under pressure into and exhausting said operating fluid from said inflatable tube.

10. A friction plate assembly, comprising: a pair of rotatable thin resilient discs; spacer means at the inner margin of said discs maintaining said discs separated to provide a space therebetween, each of said discs being slotted to provide a plurality of radially disposed highly flexible fingers; a friction member disposed on the outer side of each of said discs; means securing said friction members to said discs; an annular inflatable tube disposed in said space between said discs, said tube having opposed side walls; a metallic reinforcing ring embedded in each of said side walls adjacent the inner margin thereof; another metallic reinforcing ring embedded in each of said side walls adjacent the outer margin thereof for opposing radial distention of said tube under the action of centrifugal force; and means for introducing operating fluid under pressure into and exhausting said operating fluid from said inflatable tube.

11. A friction plate assembly, comprising: a pair of rotatable thin resilient discs; spacer means at the inner margin of said discs maintaining said discs separated to provide a space therebetween, each of said discs being slotted to provide a plurality of radially disposed highly flexible fingers; a friction member disposed on the outer side of each of said discs; means securing said friction members to said discs; a resilient backing plate engaged with the outer side of each of said discs, said backing plates having a plurality of fingers terminating at a region disposed outwardly of the inner ends of said slots, whereby to serve as a yieldable support for the flexible fingers of said discs; an annular inflatable tube disposed in the space between said discs, said tube having opposed side walls; metallic reinforcing rings embedded in each of said side walls adjacent the inner and outer margins thereof for opposing radial distention of said tube under the action of centrifugal force; and means for introducing operating fluid under pressure into and exhausting said operating fluid from said inflatable tube.

12. A clutch, comprising: a rotatable driving part including a hub, a pair of resilient discs on said hub, a spacer ring on said hub disposed between said discs and maintaining said discs separated, a flexible backing plate disposed on said hub at the outer side of each of said discs, means securing said backing plates, discs and spacer ring to said hub, each of said discs being slotted to provide a plurality of radially disposed flexible fingers, a friction member disposed on the outer side of each of said discs, means securing said friction facing members to said discs, an annular inflatable tube disposed in the space between said discs, said tube having opposed side walls, a metallic reinforcing ring embedded in each of said side walls adjacent the outer margin thereof for opposing radial distention of said tube under the action of centrifugal force; and a driven member comprising a pair of plates disposed in confronting relation with the respective friction members; and means for introducing operating fluid under pressure into said inflatable tube for effecting engagement of said friction members with said plates of said driven member.

13. A clutch, comprising: a driven part including a pair of plate members, and means maintaining said plate members in spaced apart relation; and a rotatable driving part comprising a hub, a pair of normally flat, resilient discs disposed upon said hub, spacer means on said hub at the inner margin of said discs maintaining said discs separated to provide a space therebetween, a backing plate on said hub at the outer side of each of said discs, each of said discs having a plurality of flexible fingers, a friction facing member disposed on the outer side of each of said discs in confronting relation to the plates of said driven member, means securing said friction members to certain of the fingers of the respective discs with which they are associated, an annular inflatable tube disposed in the space between said discs, said tube including opposed side walls, each of said side walls having a reinforcing ring embedded therein, and means for introducing operating fluid under pressure into said tube to flex the fingers of the two discs apart and thereby cause said friction facing members to engage with the adjacent faces of said plates, each of said backing plates having fingers engaging with the fingers of the disc adjacent thereto for assisting said disc fingers to return to their original position upon exhausting of operating fluid from said tube.

HARLAND W. CARDWELL.
GERALD G. BROWN.

REFERENCES CITED

The following references are of record in the file of this patent:

UNITED STATES PATENTS

| Number | Name | Date |
| --- | --- | --- |
| 1,466,243 | Neal | Aug. 28, 1923 |
| 1,564,717 | Scruby et al. | Dec. 8, 1925 |
| 1,988,888 | Avery | Jan. 22, 1935 |
| 2,138,393 | Wichtendahl | Nov. 29, 1938 |
| 2,169,639 | Grote | Aug. 15, 1939 |
| 2,199,785 | Dickson | May 7, 1940 |
| 2,381,166 | Hollerith | Aug. 7, 1945 |

FOREIGN PATENTS

| Number | Country | Date |
| --- | --- | --- |
| 458,931 | Germany | Apr. 23, 1928 |